United States Patent Office 3,692,614
Patented Sept. 19, 1972

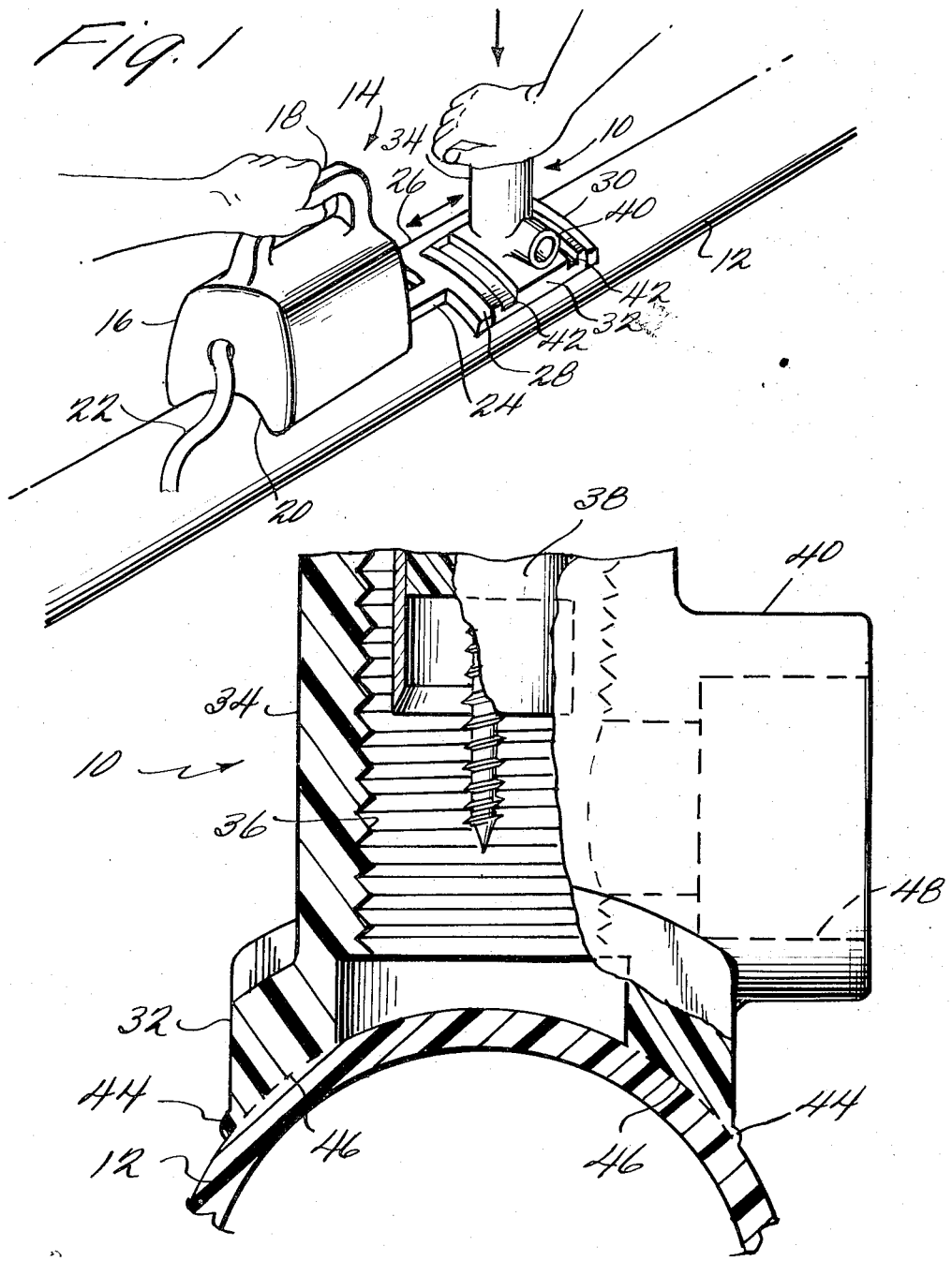

3,692,614
PLASTIC SERVICE FITTING AND METHOD AND APPARATUS FOR ATTACHING SAME
Robert R. Roos, Decatur, Ill., assignor to
Mueller Co., Decatur, Ill.
Filed Sept. 8, 1970, Ser. No. 70,115
Int. Cl. B32b 31/00
U.S. Cl. 425—108
2 Claims

ABSTRACT OF THE DISCLOSURE

Apparatus for attaching a plastic service fitting to a plastic main carrying fluid under pressure wherein a tubular fitting having a lateral outlet and a saddle portion formed with a concave face for engaging the exterior wall of the plastic main is friction welded to the main. The tubular fitting is provided with a threaded through-bore in which is disposed a tapping plug having a coupon retainer and cutter. The U-shaped arm of an oscillating tool engages the saddle portion of the tubular fitting and upon actuation of the tool rectilinear reciprocation of the fitting is effected so that, while pressure is applied to the tubular fitting, frictional heat is developed between the surface of the saddle portion of the tubular fitting and the exterior wall of the plastic main to melt the material of the surfaces in contact so that fluid-tight seal is formed.

BACKGROUND OF THE INVENTION

The present invention relates to an apparatus for securing a plastic service fitting to a plastic main carrying fluid under pressure and more particularly, for friction welding the service fitting to the main to establish a durable seal between the fitting and the main so that upon subsequent perforation of the main no escape of fluid to the atmosphere will occur.

The present invention is an improvement of the method and connection disclosed in U.S. Pat. No. 2,839,075, issued June 17, 1958, to Frank H. Mueller and assigned to the same assignee as this application, namely Mueller Co., Decatur, Ill.

Plastic service and tapping T's for connecting plastic service pipes to plastic mains, when the latter are in service, have been developed and are presently in use by utilities and by construction and building tradesmen. In the past, these T's have not been entirely satisfactory because of appreciable leakage of fluid from the main to the atmosphere during the connecting operation. Although such leakage has been relatively small, in the case of gas, any leakage whatever obviously creates a potentially hazardous situation.

Furthermore, in carrying out the tapping operations some of the prior art devices operate in such a fashion as to allow chips and cuttings to fall into the main. Creation of such debris in the main is highly undesirable as these cuttings eventually will find their way into a valve system or even into service lines themselves, resulting in the clogging of valves or burners located along the line.

Securement of the plastic service fittings of the prior art to a main have, in general, involved the use of cumbersome clamp structures which are awkward to handle and do not assure a long-lasting, fluid-tight seal.

The prior art has also suggested the use of solvent cement to form a weld between the plastic fitting and main. It has been found, however, that the use of chemical solvents depends for its success on a number of variables such as the particular composition of the plastic and solvent being used, prevailing atmospheric conditions, the amount of solvent applied to the surfaces to be welded, and the amount of time required before the solvent volatilizes or evaporates out. It can be readily appreciated that considerable time will be expended even by a skilled craftsman in coordinating and attempting to compensate for these variables in effecting a solvent weld between the plastic members. In addition, precision is required in handling the solvent so as to prevent inadvertent contact of the solvent with the bore of the fitting or the threads in the bore. Such careful handling is often a handicap in the building trades where time must be conserved.

It will be appreciated by those experienced in this art that the apparatus of the present invention substantially avoids and overcomes the deficiencies encountered by the structures and methods of the prior art as set forth above. More particularly, when consideration is given to the following detailed description, it will be seen that the present invention consists of an apparatus whereby plastic service fittings can be attached to a plastic main without the necessity of resorting to the use of cumbersome mechanical attachment devices or without experiencing the inconveniences attendant upon use of chemical solvents and which can be carried out even by relatively unskilled workers in considerably less time than has heretofore been possible.

SUMMARY OF THE INVENTION

An object of the present invention is to provide an apparatus wherein a plastic tubular fitting may be secured to a plastic main by a friction weld. A tubular fitting is provided at one end, with a saddle portion having a part cylindrical concave face adapted to conform to the exterior wall of a plastic main. The tubular fitting is also provided with a threaded through-bore and a lateral outlet for connection to a service pipe. An externally threaded tapping plug such as disclosed in U.S. Pat. No. 2,839,075, is disposed in the threaded bore of the tubular fitting. The method is carried out by placing the concave surface of the saddle of the tubular fitting in contact with the exterior wall of the plastic main. Pressure is then applied along the longitudinal axis of the tubular fitting to press the concave surface of the saddle portion into intimate contact with the surface of the plastc main. A reciprocating tool is then placed adjacent the tubular fitting and in contact with the plastic main so that the reciprocating arm of the tool engages the sides of the saddle portion of the tubular fitting. Actuation of the tool imparts vibratory motion to the tubular fitting so that as downward pressure is applied, frictional heat will be developed between the surface of the saddle and the surface of the plastic main whereby the plastic materials in contact will rapidly soften. Subsequent to the melting of the plastic materials, the vibration may be discontinued and the pressure maintained for a few moments while the plastic materials resolidify.

The tool of the present invention consists in a motor located in a housing having a portion thereof formed to engage the exterior wall of the plastic main. A reciprocating arm which is connected to and oscillated by the motor is disposed to extend from the housing so that when the tool is placed on a main, the arm will extend generally parallel to the longitudinal axis of the plastic main. The arm is formed to securely embrace the saddle portion of the tubular fitting so that upon actuation of the tool, the fitting will be vibrated longitudinally of the axis of the plastic main at a high enough frequency to generate heat between the surfaces of the plastic members in frictional contact.

Use of the tool of the present invention will enable an operator to precisely locate the service fitting on the main at the point at which it is desired to establish a fluid connection.

It will be appreciated that the tool of the present invention will permit the establishment of a secure, fluid-tight friction weld between a plastic service fitting and a plastic main in considerably less time and at considerably reduced expense than has been possible in using the methods and apparatus suggested by the prior art.

Accordingly, an object of the present invention is the provision of an apparatus for use in connecting a plastic service fitting to a plastic main by forming a fluid-tight and durable friction weld therebetween.

It is another object of the present invention to provide an apparatus for securing a plastic fitting to a plastic main which may be carried out in considerably less time than has been possible with methods proposed by the prior art.

A further object of this invention is to provide a tool for establishing a fluid connection which enables the operator of the tool to more precisely locate the plastic fitting on a desired position.

Other objects and advantages of the invention will become apparent from a consideration of the following description and accompanying drawings, in which:

FIG. 1 is a view in perspective of the tool of the present invention together with a service fitting and plastic main illustrating the method of the present invention; and FIG. 2 is a fragmentary sectional view in elevation illustrating the disposition of the service fitting and plastic main upon completion of the welding operation.

DETAILED DESCRIPTION OF THE INVENTION

In accordance with the invention, the friction welding of bodies of plastic materials together is accomplished by generating heat between the surfaces of the bodies in contact. It is well-known in the art that such heat may be generated by rubbing and then at the same time pressing the surfaces together so that the plastic materials will become soft and will intermingle due to the pressure applied. In forming a frictional weld at a particular point, one plastic body may be held stationary while a second plastic body may be positioned over the point and oscillated back and forth and pressed against the first body. In general, with small amplitudes of oscillation, the frequency of the oscillations, together with the pressure required will depend upon the type of plastic being welded, the surface area over which the weld is to be effected and the periods of time over which the oscillations are carried out. For reasons of economy, it is desirable to effect such welds in as short a time as possible. In working with pipes constructed from such materials as polyvinyl chloride, polyamides, polyurethanes, polystyrenes or polyethylene, it has been found that oscillation frequencies of about ten to one-hundred cycles per second were satisfactory, though, of course, higher frequencies may be used to effect welds between harder plastic materials. The pressure required to force the plastic material together will also vary, of course, with the hardness of the plastic materials used. It has been found, however, that in using polyvinyl chloride, pressure supplied manually will effect a suitable weld. More particularly, it has been found that with the use of the mechanical tool of the present invention, manually applied pressure will be sufficient to effect a strong frictional weld between a service fitting and main constructed of polyvinyl chloride.

Referring to FIG. 1 of the drawings, there is shown an embodiment of the tool of the present invention being used to carry out a method of securing a plastic service fitting, generally designated at 10, to a plastic main 12. The tool, generally designated at 14, is provided with a motor housing 16 having a handle 18 on its top side. The base 20 of the housing 16 is concavely shaped to engage the main 12 in a saddle-like fashion. The surface of the base (not shown) may be roughened to inhibit movement of the tool 14 when it is positioned on the main 12 while carrying out the welding operation. The motor that is disposed within housing 16 may be either of the pneumatic or electric type. A trigger (not shown) is suitably disposed in handle 18 to effect actuation of the motor and an aperture is provided in the rear wall of housing 16 to accommodate the conduit or a cable 22 for connecting the motor to either a source of fluid under pressure or a source of electrical current, depending upon the type of motor used. A vibrating arm 24 is movably mounted through the front wall of the motor housing and connected to the motor in a conventional manner so that, upon actuation of the motor, rectilinear oscillatory movement will be imparted thereto. In the embodiment shown, arm 24 is formed with a U-shaped member 26 having one leg 28 integrally attached to the end of arm 24. The other leg 30 of the U-shaped member 26 is so spaced from leg 28 as to snugly accommodate therebetween the parallel side walls of the saddle-portion 32 of service fitting 10. In order to obtain a suitable engagement of the wall of the saddle-portion 32 with the legs 28 and 30, it is advantageous to form legs 28 and 30 in the shape of arcs of a circle having a radius slightly larger than the radius of curvature of the external surface of the main 12. Additionally, it is desirable that arm 24 and associated U-shaped member 26 be attached to the motor and housing so that a clearance will be provided between the surface of main 12 and arm 24 and U-shaped member 26 during the course of the operation of the tool so as to avoid unnecessary loads on the motor. The vibrating arm 24 and U-shaped member 26 should be constructed of a sturdy material such as metal so as to be able to resist deformation through long periods of use.

The shape and dimensions of the U-shaped member 26 have been illustrated as cooperating with a plastic service T such as disclosed in U.S. Pat. No. 3,307,435, which is assigned to the same assignee as the present invention. As best seen in FIG. 2, the service fitting or T 10 is formed with a tubular body 34 having a threaded throughbore 36 in which is threadedly received an exteriorly threaded tapping plug 38 (shown in phantom lines) equipped with a cutter and coupon retainer. A lateral outlet 40 is formed transversely of tubular body 34 and communicates with bore 36. At the upper exterior end portion of body 34 threads (not shown) may be provided for receiving a threaded cap (not shown).

As more clearly seen in FIG. 1, the lower portion of the service fitting 10 is provided with a saddle 32 formed integrally with the tubular body 34. The saddle 32 comprises an enlargement extending generally transversely of the longitudinal axis of the bore 36. The upper face of the saddle 32 is formed with a pair of grooves 42 disposed to extend transversely of the longitudinal axis of the main 12 when the service fitting 10 is disposed on the main. As can be best seen in FIG. 2, saddle 32 is concavely curved so that its bottom face will have a radius of curvature approximately equal to the radius of curvature of the exterior surface of main 12.

To establish a fluid tight connection in conjunction with the tool and service fitting described above, the tool 14 is first placed on main 12 as shown in FIG. 1 with the point at which the service fitting is to be attached centered between legs 28 and 30. The service fitting 10 is then disposed on main 12 between legs 28 and 30 and pressure is manually applied, as shown in FIG. 1, downwardly along the longitudinal axis of the bore of tubular fitting 10 to press the tubular fitting against the surface of main 12. While maintaining the application of pressure, the tool 14 is actuated to vibrate arm 24 and the U-shaped member 26, as well as service fitting 10, rectilinearly about the center point on main 12 between legs 28 and 30, the oscillatory motion being generally parallel to the longitudinal axis of the main 12 as indicated by the arrows shown in FIG. 1 adjacent member 26. The operator of the tool will continue the vibration of the fitting 10 as well as the application of pressure thereto until a melt flash indicated at 44 in FIG. 2 can be seen oozing out around the edges of the saddle 32. Upon detection of the flash 44, the vibratory motion may be discontinued while the application of pressure on the fitting is maintained for a few moments to allow the softened plastic materials to resolidify.

As a practical matter, in order to facilitate transporting the tool 14 from place to place, it is desirable that the housing 16 and the motor structure enclosed therein be constructed from light-weight yet durable materials. Accordingly, it may be necessary during the operation of the tool to apply a hand pressure down on the tool to maintain its stationary contact with the main 12.

As illustrated in FIG. 2, a cross-sectional view in elevation of a completed weld between the bottom surface of the saddle 32 and the exterior surface of the main 12 is shown at 46, with the tool 14 having been removed. Where the service fitting 10 and plastic main 12 are constructed from a plastic material such as polyvinyl chloride, the welding operation can be effected in less than one minute and, immediately thereafter, a service pipe (not shown) may be inserted and secured in socket 48 of lateral outlet 40. Thereafter, the tapping operation which is fully described in U.S. Pat. No. 3,307,435 may be carried out to establish fluid communication between the interior of main 12 and the service pipe through fitting 10.

In an alternative arrangement in conjunction with the service fitting shown, arm 24 and legs 28 and 30 may be so structured that legs 28 and 30 may be snugly disposed in grooves 42 to transmit vibratory motion to the service fitting 10 as described above.

It is within the contemplation of the present invention to provide a plurality of different shaped T-engaging members to accommodate a variety of T structures. If desired, the vibratory output element of the motor of tool 14 may be provided with a releasable connecting member so that a plurality of different shaped T-engaging members may be engaged thereby.

From a consideration of the foregoing, it will be seen that the objects of this invention have been fully and effectively accomplished. It will be realized, however, that various changes may be made in the specific embodiment shown and described to illustrate the principles of the invention without departure therefrom. This invention, therefore, includes all modifications encompassed within the spirit and scope of the following claims.

What is claimed is:

1. A device for friction welding a plastic tubular fitting to a plastic pipe, said tubular fitting having a through-bore and one end shaped for engagement with said plastic pipe, said one end being formed with an integral saddle-shaped enlargement surrounding the inlet end of said through-bore, said enlargement having a concave face portion for engaging said pipe, said face portion having a radius of curvature approximately equal to the radius of curvature of the exterior surface of said pipe, said enlargement having at least two parallel side walls, one on each side of said enlargement and extending transversely of the longitudinal axis of said pipe when said fitting is disposed on said pipe, said device comprising a U-shaped member having a first arm for engaging one of said side walls and a second arm for engaging the other of said side walls, a motor, one of said arms being connected to said motor whereby, upon actuation of said motor, said U-shaped member and said tubular fitting engaged thereby will be rectilinearly oscillated along the longitudinal axis of said pipe about a point on said pipe.

2. The device as claimed in claim 1 wherein said motor is provided with a housing having a cylindrically concave shaped base for engaging the exterior surface of said pipe, said base having a roughened surface to increase frictional contact between said housing and said pipe, said housing having a handle on the side opposite said base.

References Cited
UNITED STATES PATENTS

| | | | |
|---|---|---|---|
| 3,586,590 | 6/1971 | Brenneisen | 156—73 |
| 2,933,126 | 4/1960 | Webber et al. | 156—580 |
| 3,554,846 | 1/1971 | Billett | 156—580 |
| 3,562,073 | 2/1971 | Kibler | 156—580 |
| 3,580,459 | 5/1971 | Gage | 156—73 |

DOUGLAS J. DRUMMOND, Primary Examiner